United States Patent Office 3,335,051
Patented Aug. 8, 1967

3,335,051
SELECTED N-SUBSTITUTED PIPERAZINES AND MORPHOLINES AS BIRD REPELLENTS
Andrew J. Reinert, Bartlesville, and Kenneth E. Cantrel, Dewey, Okla., assignors to Phillips Petroleum Company, a corporation of Delaware
No Drawing. Filed July 21, 1966, Ser. No. 566,777
9 Claims. (Cl. 167—46)

This application is a continuation-in-part of copending commonly assigned application Ser. No. 417,496, filed Dec. 10, 1964, now abandoned.

This invention relates to bird repellents. In one aspect, this invention relates to a method of rendering a locus repellent to birds. In another aspect, this invention relates to novel bird repellent compositions.

The prior art is replete with devices which purportedly function to prevent birds from landing or roosting within a particular locale. A few of the devices which have been used for this purpose include scarecrows, noisemakers, and the like. Since a device of this type takes advantage of the inherent wariness of birds, it frequently happens that the birds become so accustomed to the device that it is no longer effective for the purpose stated. More elaborate devices have been used for preventing birds from resting on the ledges and window sills of large buildings in metropolitan areas. One such device includes a plurality of electrical conductors attached to insulated posts or the like positioned on the ledges and window sills of a building. Birds are discouraged from resting on the ledges by passing electric current through the conductors. Although a device of this type is reasonably effective, it is expensive and extremely difficult to install.

In accordance with this invention, birds are discouraged from resting on a particular surface by applying a novel bird repellent chemical to said surface. The novel bird repellent chemical which we have discovered includes selected N-substituted piperazines and morpholines.

Accordingly, it is an object of this invention to provide a novel bird repellent composition.

Another object of this invention is to provide an effective method of rendering a locus repellent to birds.

Still another object of this invention is to provide a simple and efficient method of preventing birds from resting on a surface.

These and other objects of the invention will become apparent after studying the following detailed description and the appended claims.

According to the present invention, we have discovered that a surface can be rendered repellent to birds by applying to said surface a compound of the formula

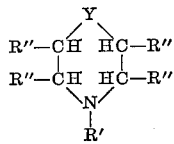

wherein
(a) R' is selected from the group consisting of

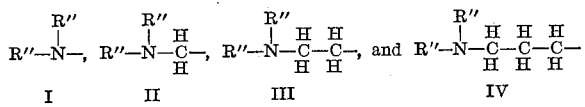

(b) R" is selected from the group consisting of hydrogen and methyl; and
(c) Y is selected from the group consisting of

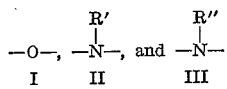

and when Y is —O—, R' is selected from the group consisting of

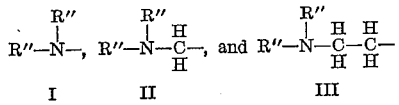

Specific examples of compounds defined by the above formula which can be used in the practice of this invention include 1-aminopiperazine,
1-(aminomethyl)piperazine,
1-(2-aminoethyl)piperazine,
1-(3-aminopropyl)piperazine,
1-amino-4-methylpiperazine,
1-(aminomethyl)-4-methylpiperazine,
1-(2-aminoethyl)-2-methylpiperazine,
1-(3-aminopropyl)-4-methylpiperazine,
1-(3-aminopropyl)-2,3,5,6-tetramethylpiperazine,
1,4-diaminopiperazine,
1,4-bis(dimethylamino)piperazine,
1-(methylaminomethyl)-4-(2-methylaminoethyl) piperazine,
1,4-bis(3-aminopropyl)piperazine,
1-(dimethylamino)piperazine,
1,4-bis(3-dimethylaminopropyl)-2,3,5,6-tetramethylpiperazine,
4-aminomorpholine,
4-(aminomethyl)morpholine,
4-(2-aminoethyl)morpholine,
2-methyl-4-(methylamino)morpholine,
2,5-dimethyl-4-(dimethylamino)morpholine,
2,3,5-trimethyl-4-(methylaminomethyl)morpholine,
2,3,5,6-tetramethyl-4-(2-dimethylaminoethyl)morpholine,
and the like.

The bird repellent compounds of this invention can be prepared in accordance with processes well known in the art. For example, 1-(2-aminoethyl)piperazine can be prepared by reacting tris(2-chloroethyl)amine with ammonium hydroxide under suitable conditions. The 4-(2-aminoethyl)morpholine can be prepared by hydrogenating 4-(cyanomethyl)morpholine under suitable conditions of temperature and pressure.

The bird repellent compounds of this invention can be applied to a surface for their intended purpose as the pure compound, either as free bases or acid salts, or in solution in an inert solvent. Suitable inert solvents which can be used in the practice of this invention include acetone, kerosene, naphthas, and isoparaffinic hydrocarbons which boil in the range of from about 260° to 800° F. The bird repellent compounds can also be applied to a surface in admixture with water in the form of an aqueous emulsion in which case a suitable emulsifying or wetting agent is employed. In certain instances it may be desirable to apply the compounds as a dust or a powder. The compounds can be dispersed in a solid carrier such as kieselguhr and the like when applied in this manner. A suitable adhesive can be admixed with the liquid or solid carrier such that the bird repellent compound will remain on the surface to which it is applied over extended periods of time. The use of an adhesive is generally preferred when the bird repellent is applied to exposed ledges and window sills of buildings because it will be less affected by the action of rain and wind. Examples of materials which can be used as carriers and which also function is an adhesive are rubber latices including those of the natural and synthetic type, such as polymers of butadiene, isoprene and copolymers with vinyl compounds such as styrene, gelatins, substituted cellulose such as methyl cellulose, and low molecular weight polymers such as polyisobutylene and petrolatum. Latex has been found to be particularly suitable as a carrier and adhesive because of the high degree of repellency obtained when it is admixed with the bird repellent compounds of this invention.

The bird repellent compounds of this invention can be applied in the previously described forms by spraying, brushing, dusting, and the like. It is generally preferred to apply the compounds by spraying them onto a surface with a liquid solvent as a carrier. It was found that an extremely uniform application can be achieved by applying the compounds in this manner. When the bird repellent compounds are dissolved in one of the solvents described above, the mixture will contain from about 0.1 to 60 weight percent of the compound. When the compound is dispersed in a solid carrier, it is present in an amount within the range of from about 1 to about 60 weight percent based upon the total weight of the mixture. Although these ranges have been given to be effective for repelling birds when applied to a surface, it is to be understood that concentrations above and below these ranges can be used.

It was discovered that the compounds of this invention are effective to repel birds from a surface when present on the surface in an amount within the range of from about 0.01 to 25 grams per square foot of surface area. Although larger amounts of the bird repellent compounds can be used without departing from the spirit and scope of the invention, for obvious economic reasons it is generally preferred not to exceed about 25 grams per square foot of surface area.

A series of tests was made in which several piperazine and morpholine compounds were used as repellents for starlings, pigeons, and sparrows. The following examples will serve to illustrate the effectiveness of these compounds is bird repellants. It is to be understood that these examples are for the purpose of illustrating the invention and must not be construed to be limiting thereof.

*Example I*

Two starlings were released in a cage having a roosting bar. After the starlings became accustomed to their surroundings, it was observed that they spent approximately 95 percent of the elapsed time on the untreated roosting bar. One gram of 1-(2-aminoethyl)piperazine was then spread evenly over the upper surface of the roosting bar and the activity of the starlings was observed. A roosting index defined as the ratio of the time spent by the birds on the treated roosting bar to the total elapsed time was then used to determine the effectiveness of the compound. On the basis of seven experiments with seven different pairs of starlings, the average roosting index was calculated to be 0.31 for the roosting bar having the 1-(2-aminoethyl)piperazine deposited thereon.

*Example II*

Another test was conducted in accordance with the conditions described in Example I except that one gram of 1-amino-4-methylpiperazine was deposited on the roosting bar. On the basis of five experiments with five pairs of starlings, the average roosting index was calculated to be 0.51.

*Example III*

A test was also conducted in accordance with the conditions of Example I using 4-(2-aminoethyl)morpholine as the active bird repellent compound. A pair of starlings was placed in the cage and their roosting time was compared with the total elapsed time the birds remained in the cage. On the basis of data collected from eight separate experiments, the roosting index was calculated to be 0.46.

*Example IV*

A test was also carried out in which 1-(3-aminopropyl)-4-methylpiperazine was applied to the roost in accordance with the procedure employed in Example I. Eight separate pairs of starlings were used to determine the effectiveness of the compound. The average roosting index was calculated to be 0.45 on the basis of the activity of the starlings during each of the experiments.

*Example V*

In another experiment, 1-(2-aminoethyl)piperazine was deposited on the eaves of a building which had been repeatedly used as a roost by pigeons. The effectiveness of the compound was proved by observing that no pigeons roosted on the eaves for over one week.

*Example VI*

A series of tests was conducted in which 1-(2-aminoethyl)piperazine was tested alone and in admixture with one of several different adhesive carriers as repellents for starlings. A wire screen cage having vertical sides was provided with two horizontal roosting bars. The bottom surface of the cage was immersed in a vessel containing water such that the roosting bars afforded the only horizontal resting surface. Four starlings were released in the cage and after they became accustomed to their surroundings it was observed that the starlings spent about equal time on both roosting bars. 1-(2-aminoethyl)piperazine was then applied to one of the roosting bars. After one hour, the number of starlings resting on both roosting bars was observed. Observations were made every 15 minutes thereafter until a total of five readings was obtained. The same technique was repeated to test the effectiveness of the 1-(2-aminoethyl)piperazine in admixture with different adhesive carriers. The results of the several tests are illustrated in Table I below.

TABLE I

| Test Number | Composition Applied to One Roosting Bar | Amount Applied | Number of Birds on Both Roosting Bars at Each Time Interval After the Compound Was Applied | | | | | Total |
|---|---|---|---|---|---|---|---|---|
| | | | 60 min. | 75 min. | 90 min. | 105 min. | 120 min. | |
| 1 | 1-(2-aminoethyl)piperazine | 2 grams | 1 | 0 | 0 | 0 | 0 | 1 |
| | Untreated Roosting Bar | | 0 | 1 | 4 | 4 | 1 | 10 |
| 2 | 1-(2-aminoethyl)piperazine | 2 grams | 0 | 0 | 0 | 0 | 0 | 0 |
| | Latex [1] | 0.4 gram (mixture) | | | | | | |
| | Untreated Roosting Bar | | 4 | 4 | 4 | 4 | 4 | 20 |
| 3 | 1-(2-aminoethyl)piperazine | 2 grams | 1 | 1 | 0 | 0 | 0 | 2 |
| | Methyl cellulose [2] | 0.4 gram (mixture) | | | | | | |
| | Untreated Roosting Bar | | 1 | 1 | 4 | 4 | 4 | 14 |

[1] 20% latex of 76.5/23.5 butadiene/styrene emulsion copolymer (38 ML-4).
[2] Commercial (Dow Methocel 60HG) methyl cellulose containing 28-30% methoxyl groups and 7-12% propylene glycol ether groups.

The "Total" column in Table I represents the sum of the number of starlings on the individual roosting bars for each observation for each material tested. It is apparent that a figure of zero for a particular roosting bar would indicate no starlings on that roosting bar at each 15-minute interval during the test. A figure of 20, on the other hand, would indicate that all four birds were present on the roosting bar at each 15-minute interval. As shown by the data collected for test number 2, the 1-(2-aminoethyl)piperazine in admixture with latex was proven to be very effective.

Example VII

In a field test, it was noted that a flock of from about 12 to about 16 house sparrows had been roosting regularly each night for a period of over two weeks on a sill beneath a large wooden awning. A 10 percent by weight aqueous dispersion of 1-(2-aminoethyl)piperazine was applied to the upper surface of the sill. The number of sparrows returning to the roost each evening decreased until the third day whereupon it was determined that none of the birds used the sill as a roost. Continued observation for a period of two weeks revealed that none of the sparrows returned to the sill.

The toxicity of the selected N-substituted piperazines and morpholines to fish, rats, and baby chicks was evaluated to determine whether or not the compounds could be used as bird repellents under conditions wherein they are likely to be contacted by other animals. Two containers constructed of a synthetic plastic material were charged with seven liters of water. 1-(2-aminoethyl) piperazine was then added to the water in both containers to provide a concentration of about 10,000 parts per million. Five fish were then placed in each of the containers and the water was tested for oxygen content, acidity, and temperature. The fish were observed periodically for a period of 48 hours and at the end of this period none of the fish had died. The toxicity of 1-(2-aminoethyl)piperazine to baby chicks and rats was determined by administering the compound orally. The effect on the baby chicks and the rats was noted, and sufficient chemical was given to determine the $LD_{50}$. $LD_{50}$ is the quantity required in mg. of chemical per kg. of animal weight to kill 50 percent of the animals. The $LD_{50}$ for the baby chicks and the rats was determined to be within the range of from about 1500 to 2000 mg./kg.

The phytotoxicity of 1-(2-aminoethyl)piperazine to trees including oak, elm, and maple was determined by applying the pure compound to the leaves and smaller branches. Slight damage was observed on the maple tree. The oak and elm trees were damaged negligibly by the compound. The compound was then diluted with water to provide a 50 percent solution. This solution was applied to the trees and it was observed that there was no damage to the oak and elm trees. A minor amount of damage was observed on the tender surfaces of the maple trees.

It can thus be seen that the selected N-substituted piperazines and morpholines of this invention are effective as bird repellents and at the same time are not toxic when digested by birds under normal conditions. The compounds of this invention can also be applied to trees without danger of causing serious damage to them.

Although the invention has been described in considerable detail, it is to be understood that such detail is for the sole purpose of illustrating the invention. It is apparent that many variations and modifications can be made without departing from the spirit and scope of the invention.

We claim:
1. A method of repelling birds which comprises applying to a locus from which birds are to be repelled a compound of the formula

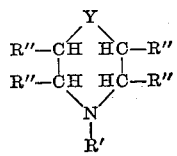

wherein
(a) R' is selected from the group consisting of

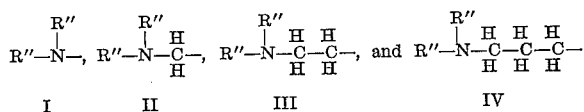

(b) R'' is selected from the group consisting of hydrogen and methyl; and
(c) Y is selected from the group consisting of

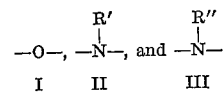

and when Y is —O—, R' is selected from the group consisting of

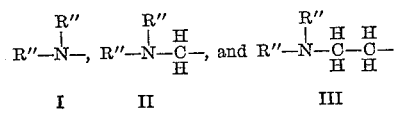

2. A method according to claim 1 wherein said compound is 1-(2-aminoethyl)piperazine.
3. A method according to claim 1 wherein said compound is 1-amino-4-methylpiperazine.
4. A method according to claim 1 wherein said compound is 4-(2-aminoethyl)morpholine.
5. A method according to claim 1 wherein said compound is 1-(3-aminopropyl)-4-methylpiperazine.
6. A method according to claim 1 wherein said compound is applied by means of a liquid carrier selected from the group consisting of water, acetone, kerosene, naphthas and isoparaffinic hydrocarbons which boil in the range of about 260° to about 800° F.
7. A method according to claim 1 wherein said compound is applied in admixture with an adhesive selected from the group consisting of latex, gelatin, methyl cellulose, polyisobutylene, and petrolatum.
8. A method according to claim 1 wherein said compound is dispersed in kieselguhr prior to being applied to said surface.
9. A method according to claim 1 wherein said compound is applied in an amount to provide about 0.01 to about 25 grams of compound per square foot of surface area.

References Cited
UNITED STATES PATENTS 3,044,930 7/1962 Goodhue _____ 167—46
3,156,613 11/1964 Goodhue _____ 167—46

ALBERT T. MEYERS, *Primary Examiner.*

SAM ROSEN, *Examiner.*

STANLEY J. FRIEDMAN, *Assistant Examiner.*